(12) United States Patent
Smallwood et al.

(10) Patent No.: US 7,282,891 B2
(45) Date of Patent: Oct. 16, 2007

(54) METHOD FOR CHARGING A BATTERY

(75) Inventors: Ralph D. Smallwood, Cary, IL (US); Robert M. Johnson, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 144 days.

(21) Appl. No.: 10/334,161

(22) Filed: Dec. 30, 2002

(65) Prior Publication Data

US 2004/0124810 A1    Jul. 1, 2004

(51) Int. Cl.
*H01M 10/44*    (2006.01)

(52) U.S. Cl. .................................. 320/137

(58) Field of Classification Search .......... 320/137, 320/136, 134, 125, 114, 112, 106, 128, 130, 320/131, 132, 127, 149, 113
See application file for complete search history.

(56) References Cited

U.S. PATENT DOCUMENTS

| | | | |
|---|---|---|---|
| 4,910,103 A * | 3/1990 | Yoshikawa et al. ........... 429/61 |
| 5,164,652 A * | 11/1992 | Johnson et al. ............. 320/106 |
| 5,237,257 A | 8/1993 | Johnson et al. ................ 320/2 |
| 5,416,402 A * | 5/1995 | Reher et al. ........... 340/636.15 |
| 5,481,174 A | 1/1996 | Martin et al. ................. 320/14 |
| 5,705,915 A | 1/1998 | Douglas et al. ............... 320/31 |
| 5,811,890 A * | 9/1998 | Hamamoto ................... 307/66 |
| 5,986,430 A | 11/1999 | Fernandez et al. .......... 320/106 |
| 5,994,876 A * | 11/1999 | Canny et al. ............... 320/132 |
| 6,040,683 A | 3/2000 | Mottier ....................... 320/137 |
| 6,337,560 B1 | 1/2002 | Kalogeropoulos et al. .. 320/160 |
| 6,344,733 B1 * | 2/2002 | Crass et al. ................. 320/143 |
| 6,577,104 B2 * | 6/2003 | Sakakibara ................. 320/132 |
| 2003/0096158 A1 * | 5/2003 | Takano et al. ................ 429/90 |

* cited by examiner

*Primary Examiner*—Edward H. Tso
(74) *Attorney, Agent, or Firm*—David S. Noskowicz (57) ABSTRACT

A method and apparatus for charging a rechargeable battery (110) that takes into account the use patterns of the particular battery. A user may only discharge the battery a little and recharge it frequently which is a low capacity high life cycle use pattern, or discharge the battery almost completely and place the battery on charge less frequently indicating a high capacity low life cycle use pattern. Herein, a battery is installed in an electronic device wherein a battery discharge determination circuit and a discharge determination algorithm determine the discharge level of the battery when a charging circuit is placed on the battery. The measurement algorithm determines from the rechargeable battery discharge level measurement how to recharge the rechargeable battery. The measurement algorithm may also determine how to recharge the rechargeable battery based on a plurality of previous measurements stored either in the electronic device or the battery.

30 Claims, 8 Drawing Sheets

|  | DEEP DISCHARGE | SHALLOW DISCHARGE |
|---|---|---|
| FREQUENT CHARGING | FASTER CHARGE RATE TO LOWER CHARGE VOLTAGE | FASTER CHARGE RATE TO HIGHER CHARGE VOLTAGE |
| IN-FREQUENT CHARGING | LOWER CHARGE RATE TO HIGHER CHARGE VOLTAGE | LOWER CHARGE RATE TO HIGHER CHARGE VOLTAGE |

METHOD FOR CHARGING A BATTERY

FIELD OF THE INVENTIONS

The present invention relates generally to portable communication devices, and more particularly to a method for charging the battery of portable communication devices.

BACKGROUND OF THE INVENTIONS

There are three basic types of rechargeable batteries: nickel cadmium, nickel metal hydride, and lithium ion. Lithium Ion batteries are a high energy density, 3.6V battery. It uses lithium metallic oxide in its positive electrode, or cathode, and carbon material in its negative electrode, or anode. Lithium ions inside the battery transfer between the positive electrode and the negative electrode during charge or discharge.

Rechargeable batteries can be embedded or removable from the device. Many battery chargers use a dual rate charge sequence in which the battery under charge is charged at a fast rate for a period of time, and then charged at a slower or "trickle" rate once the battery has reached a predetermined charge level.

Rapid charge sequences are terminated by using either an inflection in the battery voltage versus time (V), or inflection in the temperature versus time (T), or when the battery reaches a certain voltage constant current constant voltage (CC-CV). At this point, typically the charger switches to a lower rate of charge. This lower rate of charge could be a fixed lower charge rate, or a variable rate, which is lower than the full rate. This rate is called a trickle charge rate or a top-off charge rate. For Lithium Ion batteries, this rate is adjusted so that the battery voltage does not exceed a predetermined voltage value. This is known as the CV portion of the CC-CV profile.

Lithium Ion batteries are typically charged by using the CC-CV method. A CC-CV method algorithm charges the battery at a fixed current rate up to a predetermined voltage. Once the predetermined voltage is achieved, the charger switches to a trickle or slower charge rate. The predetermined voltage is typically selected by the manufacturer. For this voltage there is an associated battery capacity and charge cycle life.

Charge cycle life is defined as the number of full charge cycles that the battery can withstand before its capacity degrades to a specified percentage of its original capacity (typically 80%).

A user who charges his battery infrequently would benefit from a higher predetermined voltage which corresponds to a higher capacity but lower charge cycle life. This is because the end user doesn't use as many charge cycles and would likely charge the battery even less often if he got a higher capacity to use between charges.

A user who charges his battery frequently would benefit from a lower predetermined voltage which corresponds to a lower capacity but higher charge cycle life. This is because the end user uses many charge cycles and his battery would last longer if it could wear out at a slower rate.

Accordingly, an algorithm is needed to determine the voltage to charge the battery up to based upon a user's battery usage pattern, eliminating the need of the manufacturer to select a predetermined voltage.

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTION

Rechargeable batteries are charged using a dual rate charge sequence. The battery is charged at a fast rate for a period of time, and then charged at a slower or "trickle" rate once the battery has reached a first voltage value or predetermined recharge level otherwise know as a termination voltage or taper voltage value. This is to allow the battery to reach a full charge. The predetermined taper voltage value is generally selected by the manufacturer based on a change in temperature of the battery or change in the batteries voltage.

The predetermined taper voltage value for Lithium Ion batteries is typically based upon the change in voltage. The battery is charged at a fixed current rate up to a predetermined taper voltage value. Once the predetermined taper voltage value is reached, the charge switches to a trickle charge or slower charge rate.

A rechargeable battery will perform differently depending on the taper voltage value to which the battery is charged and the rate at which it is charged. A predetermined taper voltage value is typically selected by the manufacturer based upon the desire to maximize either the battery capacity or the battery cycle life. The battery capacity will directly affect the affective battery duration per use from the effective full charge to the effective full drain. The battery life cycle is how long the battery will last, how many times, cycles the battery can be recharged before the battery cannot be effectively charged again or holds an effective charge. The value of the predetermined taper voltage value falls within a given overall voltage range for a given battery type. An inverse relationship exists wherein the predetermined taper voltage value setting that increases the battery capacity will decrease the battery cycle life.

A user who does not charge their battery relatively frequently would want the predetermined taper voltage value to be selected to maximize the battery capacity. This would give the battery a greater capacity and therefore longer operation time of the device per battery charge. Whereas, a user who charges their battery relatively frequently would want the predetermined taper voltage value to be set to maximize the battery cycle life, i.e. achieving more cycles out of the battery. The present invention relates to a method of charging the battery based on a user's actual usage and not a predetermined taper voltage value. The actual usage of the device and hence the battery charge pattern is monitored in order to determine the most effective method of charging the battery to increase optimization of device use for the user.

Figure 1:
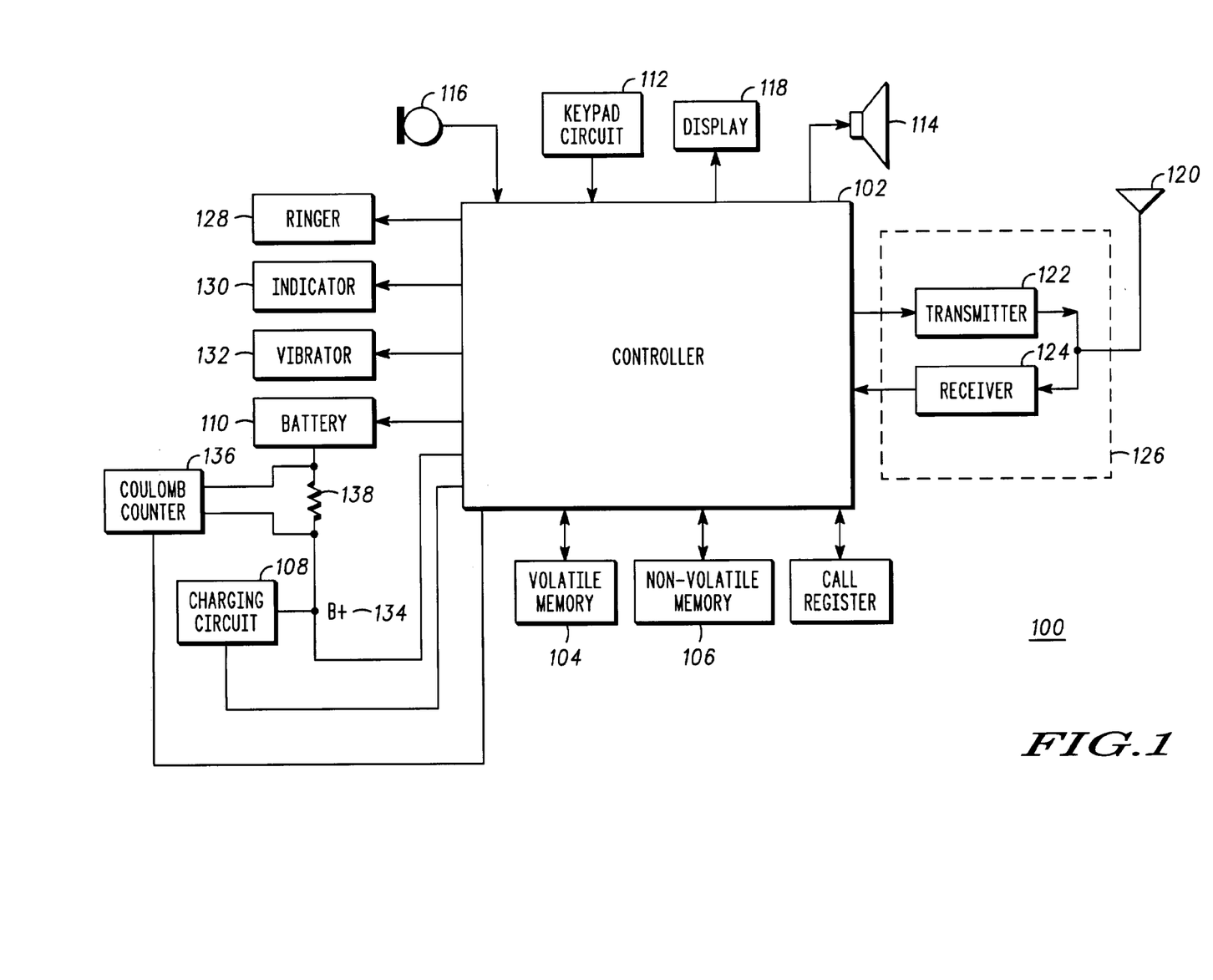
FIG. 1 is an electrical block diagram of a portable communication device according to the present invention.

FIG. 1 is an electrical block diagram illustrating a circuit 100 portion of a portable communication device. Circuit 100 includes a controller 102, which may be a microprocessor, a micro-controller, a digital signal processor (DSP), a programmable logic unit, or a combination thereof. For example a 6800 microprocessor available from Motorola may be used. Controller 102 can include volatile memory 104, which may for example be random access memory (RAM), and non-volatile memory 106, which may be implemented using Electronically Erasable Programmable Read Only Memory (EEPROM), Flash Read Only Memory (ROM), Electronically Programmable Read Only Memory (EPROM), or the like. Controller 102, or Central Processing Unit (CPU), selectively controls the operation of portable communication device including the manner in which to charge the battery as described below.

In an exemplary embodiment, controller 102 receives information from the charge controller 108 in the portable communication device. Charge controller 108 monitors characteristics of a battery 110. A coulomb counter 136 may be a part of the charge controller 108. Based on the characteristics of the battery 110, charge controller 108 communicates to controller 102 to set the predetermined taper voltage in the recharging of the battery 110 which will result in either maximized capacity or cycle life, depending on the use pattern.

Controller 102 receives user inputs from keypad 112. Controller 102 is also connected to speaker 114 that outputs audio and microphone 116 that inputs audio. Controller 102 drives display 118 that is used to show information to the user.

Antenna 120, a radio frequency (RF) input, is connected between transmitter 122 and receiver 124 of transceiver 126. Transmitter 122 transmits data from controller 102 and receiver 124 receives data and relays the information to controller 102. Ringer 128, indicator 130, and vibrator 132 are alerts for the user and are coupled to controller 102.

In one exemplary embodiment of the invention, battery 110 is integrated as part of the potable communication device although, battery 110 could be removable from the portable communication device.

Figure 2:
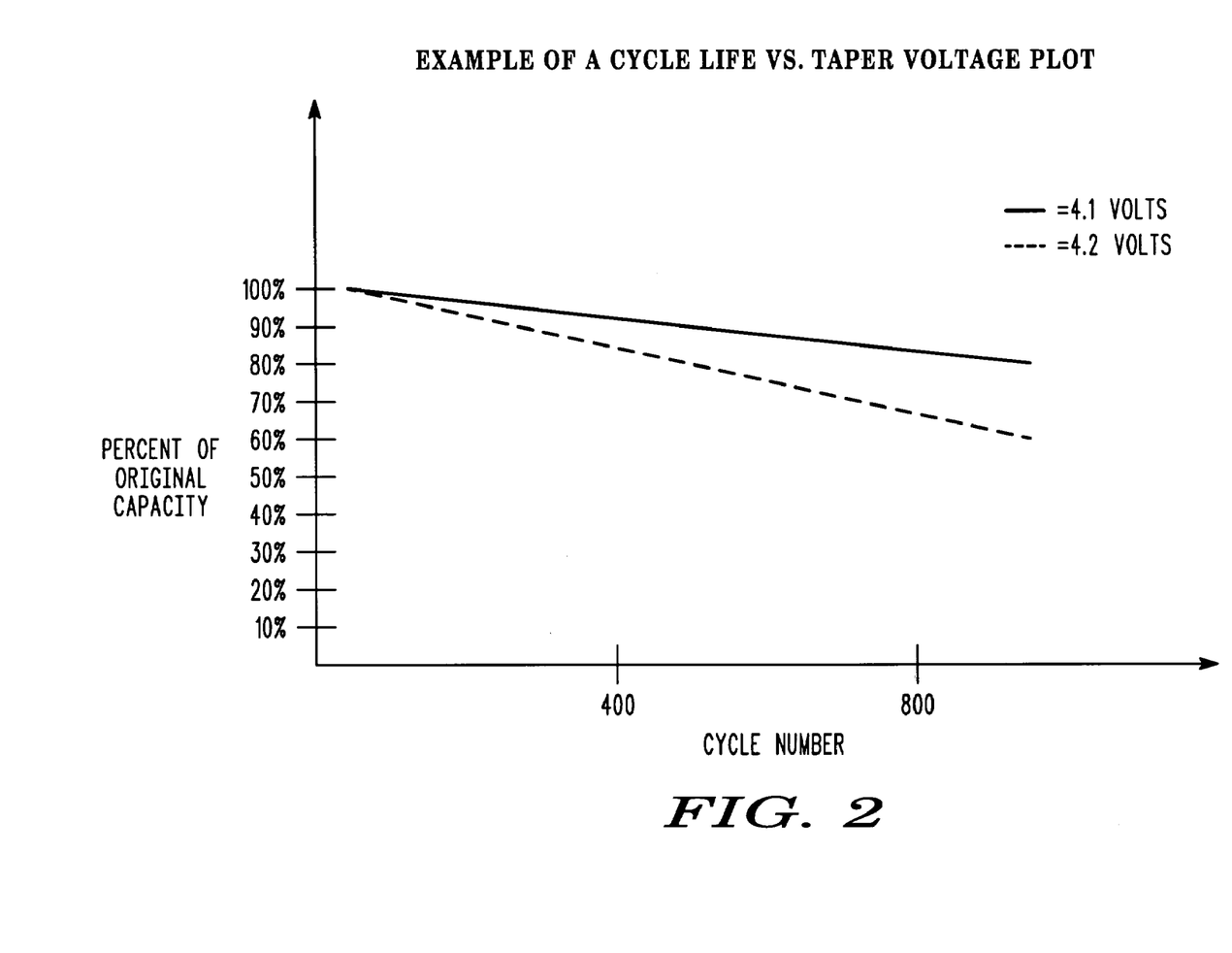
FIG. 2 is an exemplary graph of battery cycle life as a function of charge voltage.

In FIG. 2 an exemplary graph indicates the cycle life characteristics of a rechargeable battery. The graph shows the discharge capacity and the life cycle number as a function of the recharge voltage level or taper voltage. The graph illustrates that charging the battery to a taper voltage of 4.2 volts increases the discharge capacity while at the same time it decreases the number of total cycles or cycle life. From either the single present measurement or the single present measurement in combination with previously stored measurements, the battery is recharged to maximize the performance of the battery based on the discharge level or characteristic or discharge level or characteristic pattern. The battery discharge level pattern of said rechargeable battery is determined from the previously stored measurements in combination with the present measurement. In either case the battery is recharged based on previous use.

Determining a discharge characteristic depends upon when user recharges the battery relative to the discharge level and the time between the last charge and the current recharge. A discharge characteristic may also be a plurality of discharge levels that form a discharge level pattern. When the battery is coupled to a charging circuit it will determine or measure the present discharge characteristic and it will also determine the time since the last recharging. From the present discharge measurement, the plurality of discharge measurements together or the time between charging considered individual or in a combination thereof, a recharge characteristic is determined that correlates to a certain level or time of each discharge characteristic.

To recharge the battery and optimize performance over the life of the battery, a battery recharge method or characteristic is determined in accordance with either the presently measured discharge level or discharge level pattern or the time between recharging. In one embodiment the single discharge level measurement is used to determine the recharge characteristic. In this case, if the discharge level is greater than a predetermined discharge value the battery will be recharged by a first recharge method. If the discharge level or pattern is less then the predetermined discharge value, the battery will be recharged by a second recharge method.

Figure 3:
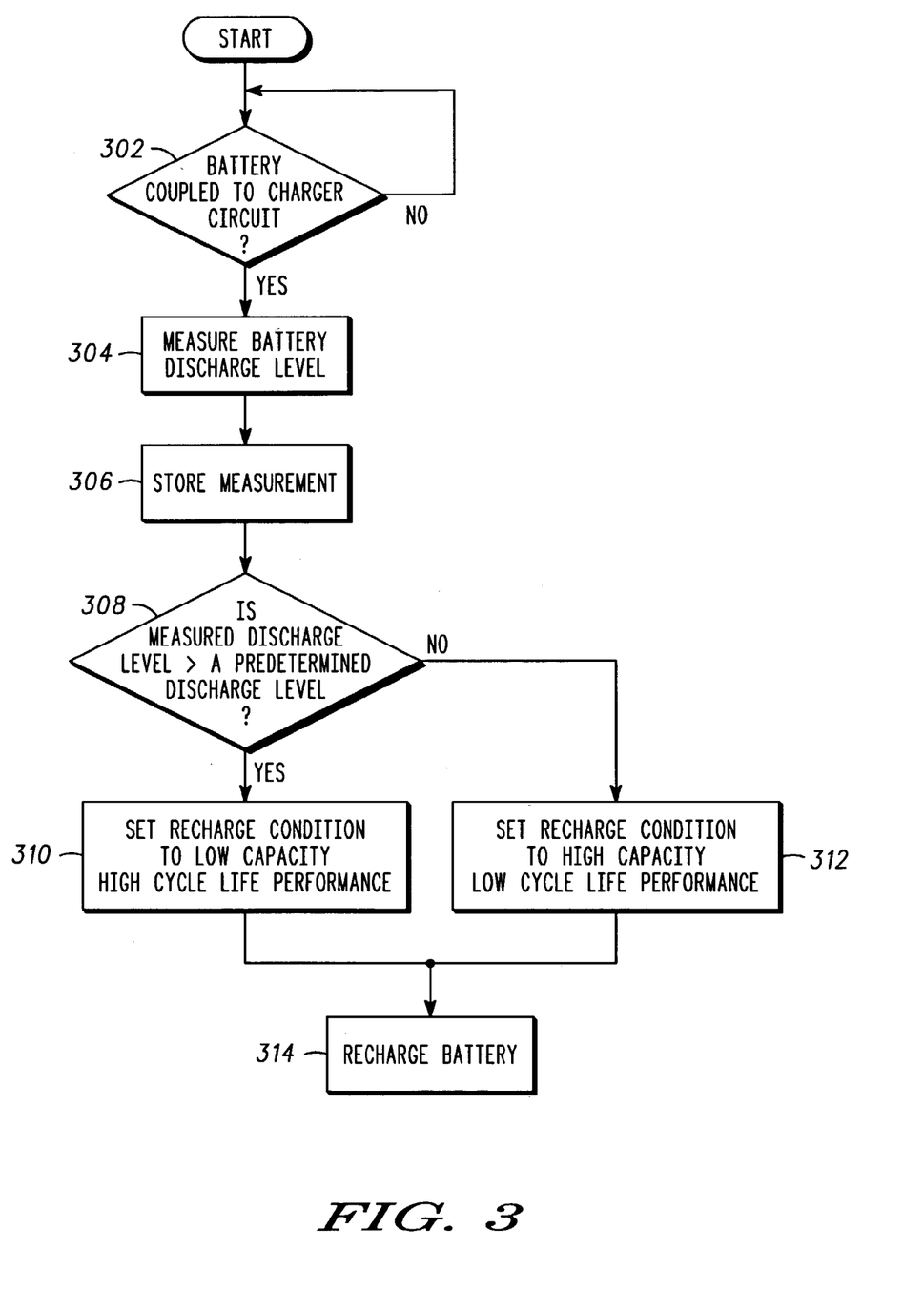
FIG. 3 is an exemplary flow diagram for selecting charging method.

A method of charging a battery shown in FIG. 3 comprises measuring a battery discharge level of the battery 304 after coupling the battery to the charger and determining a battery recharge characteristic, voltage or charge rate, that will improve the battery performance over the life of the battery based on the discharge characteristics. The battery use pattern can be determined from the discharge level of the battery when the battery is placed on recharge. When the battery is connected to the charging circuit 302 it is also coupled to a battery discharge measurement circuit. The battery discharge level is measured upon connection of the battery to the charger 304. Next, the battery discharge level is optionally stored 306 in a memory 104. The discharge level is compared to a predetermined discharge value 308. If the measured battery discharge level is greater than a predetermined discharge level then the battery is charged to optimize the battery performance of a high cycle life 310. If the measured battery discharge level is less than the predetermined discharge level then the battery is charged to optimize the battery performance of a low cycle life 312.

For example, in one embodiment the predetermined discharge level is set at 50% charge. If the battery is measured and the battery discharge level is 75%, it would be greater than the predetermined level of 50% charge. The battery has only been discharged 25% and the user would be characterized as a "high cycle life."

There are several ways to determine the battery discharge level. First, the battery discharge may be measured by determining the number of coulombs the battery receives during said recharging of said battery. In FIG. 1, The charge current, from the charging circuit goes into the B+ node 134, then through the sense resistor 138 and into the Battery 110. The voltage across the sense resistor 138 is proportional to the current going into the battery or cell. In this implementation, the Coulomb Counter 136 is used to integrate or sum the current multiplied by the time to record the total number of Coulombs that go into the battery during a charge cycle.

In a typical implementation, using a 1000 mAH battery, is that if during charging, 200 mAH goes into the battery, then the end user is a 'low user' and would likely benefit from a lower capacity and higher cycle life type of charge, so a lower voltage of 4.10 volts would achieve this performance. Alternately, if 800 mAH went into the battery, then the user is a 'high user' and would benefit from a higher capacity and lower cycle life type of charge, so a higher voltage of 4.20 volts would achieve this performance.

Another method for determining the battery discharge level is by determining the number of coulombs the battery expends during said discharging of the battery. The current going from the battery 110 into the B+ node 134 goes through the sense resistor 138. The voltage across the sense resistor is proportional to the current going out of the Battery. In this implementation, the Coulomb Counter 136 is used to integrate or sum the current multiplied by the time to record the total number of Coulombs that come out of the battery during discharge.

In a typical implementation, using a 1000 mAH battery, is that if during discharging, 200 mAH goes out of the battery, then the end user is a 'low user' and would likely benefit from a lower capacity and higher cycle life type of charge, so a lower voltage of 4.10 volts would achieve this performance. Alternately, if 800 mAH discharged out of the battery, then the user is a 'high user' and would benefit from a higher capacity and lower cycle life type of charge, so a higher voltage of 4.20 volts would achieve this performance.

An even further method is to estimate the battery discharge level by tracking, between a first charging and a second charging of said battery, the time that the device is in each mode of operation. Each mode of operation has an average current drain over time associated with the mode. The current drain is then calculated for each length of time the device spends in each mode and the individual current drain estimates are added together to find the total current drain estimate. Another method is to measure the time between a first charge and a second charge. These methods of determining the discharge level of the battery just examples and one skilled in the art will appreciate these and other methods of determining a discharge level.

In another embodiment a simple time between charging cycle is used. An example of this is illustrated, again using a 1000 mAH battery, is by identifying that the time since the previous charge has been 2 hours, then the end user is a 'low user' and would likely benefit from a lower capacity and higher cycle life type of charge, therefore charging the battery to a lower voltage of 4.10 volts would achieve this performance. Alternately, if the time since the previous charge has been 5 days, then the end user is a 'high user' and would benefit from a higher capacity and lower cycle life battery performance, therefore a higher voltage of 4.20 volts would achieve this performance.

Figure 4:
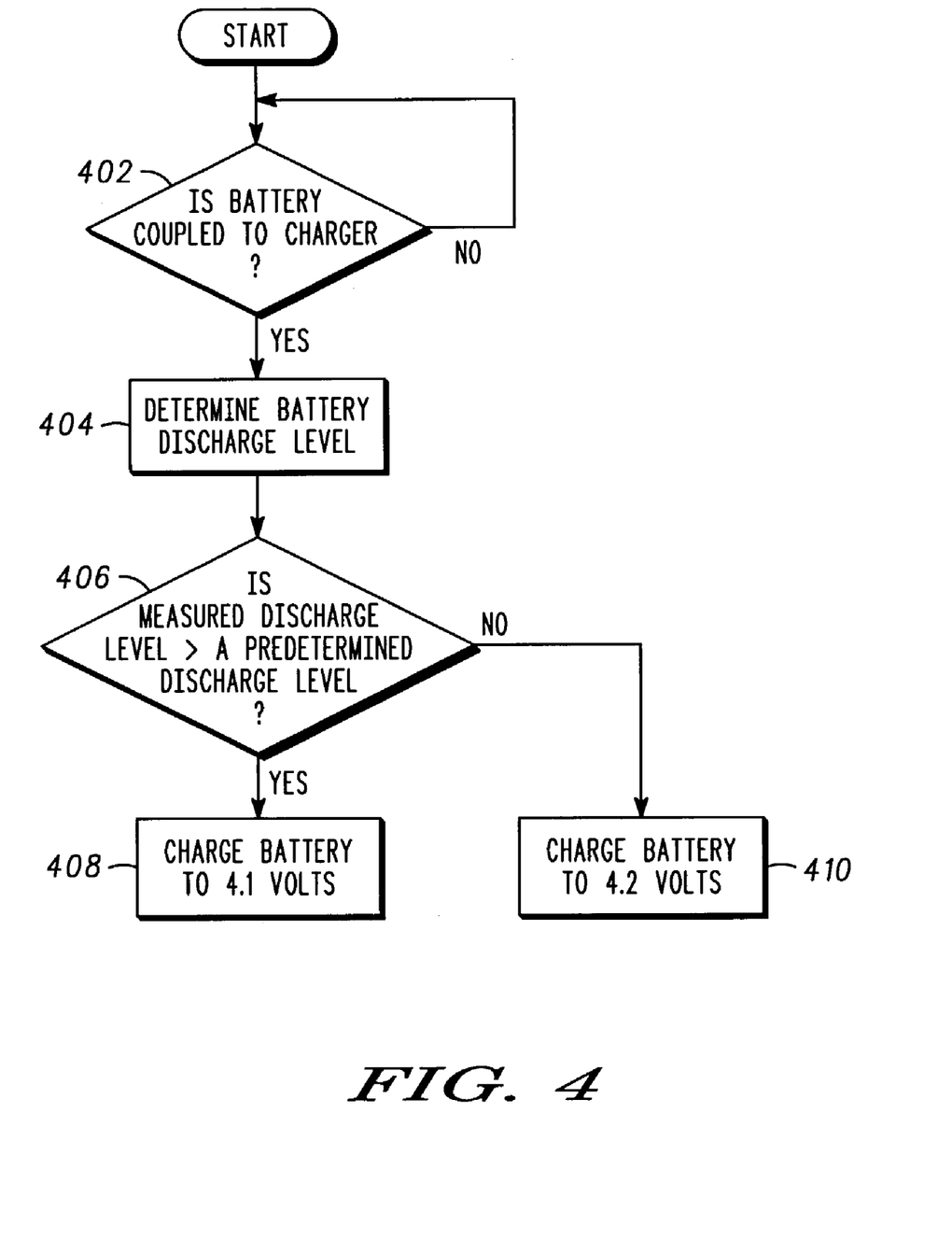
FIG. 4 is an exemplary flow diagram for selecting voltage charging method.

In an exemplary embodiment shown in FIG. 4, the recharge method is accomplished by charging the battery to a certain voltage that will achieve the desired battery performance. In one exemplary embodiment, shown in FIG. 4, once the battery is coupled to a charging circuit 402, the battery discharge level is determined 404. Next the discharge level is compared to a predetermined discharge value 406. If the measured discharge level 404 is greater than the predetermined discharge value, the battery is recharged to a first voltage of 4.1 volts 408 to optimize the battery performance for high cycle life and lower capacity. Recharging the battery to 4.1 volts is optimal, but a range between a second voltage of 4.05 volts and a third voltage of 4.15 will produce substantially the same effect in this embodiment. If the measured discharge level 404 is less than the predetermined discharge value, the battery is recharged to a fourth voltage of 4.2 volts optimizes the battery performance for higher capacity and lower cycle life. Again an effective range is greater than a fifth voltage of 4.15 volts up to a sixth voltage of 4.25 volts.

Figure 5:
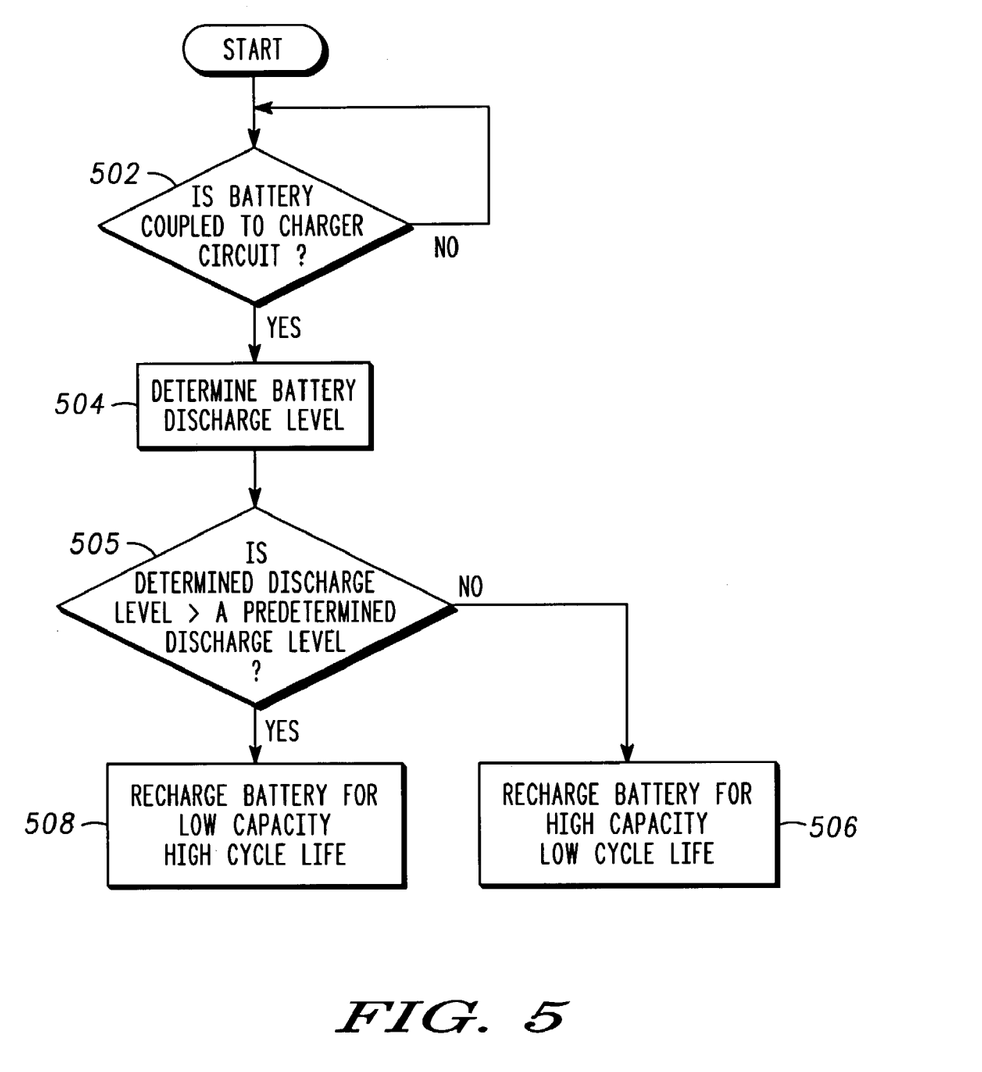
FIG. 5 is an exemplary flow diagram for selecting charging rate method.

In another exemplary embodiment shown in FIG. 5, recharging said battery by applying different currents or charge rates will also alter the performance of the battery. Again the process is initiated by apply a charger to the battery 502 and taking a measurement of the battery discharge level 504. Recharging the battery at the first current will optimize battery performance for low cycle life 506 and recharging the battery with a second current will optimize battery performance to be a high cycle life 508.

In one embodiment, for the Low Cycle life discharge pattern, a charge rate equal to twice the battery's capacity could be used. In this embodiment, the charge rate would be 2000 mA for a 1000 mAH battery. For the High Cycle life discharge pattern, a charge rate equal to half the battery's capacity could be used. The charge rate in this embodiment would be 500 mA for a 1000 mAH battery.

A current calculation would follow the equation:

$$Y = B - AX \quad (1)$$

Y is the Battery Recharge Current Level,

A is the percentage of charge remaining in the battery (lets say 80%)

X is the max to min of the Charge Current values targeted for use (for this example, 1500 mA)

B is the maximum Charge Current to be used.

For the example of the embodiment:

$$Y = 2000 \text{ mA} - 80\% \times 1500 = 800 \text{ mA} \quad (2)$$

The same applies for the recharge voltage calculation:

Y is the battery recharge voltage level,

A is the percentage of charge remaining in the battery (lets say 80%)

X is the max to min of the charge voltage values targeted for use (for this example, 0.1 volts)

B is the maximum charge voltage to be used (4.20 volts).

For the example of the embodiment:

$$Y = 4.20 - 80\% \times 0.1 = 4.12 \text{ volts} \quad (3)$$

Figure 6:
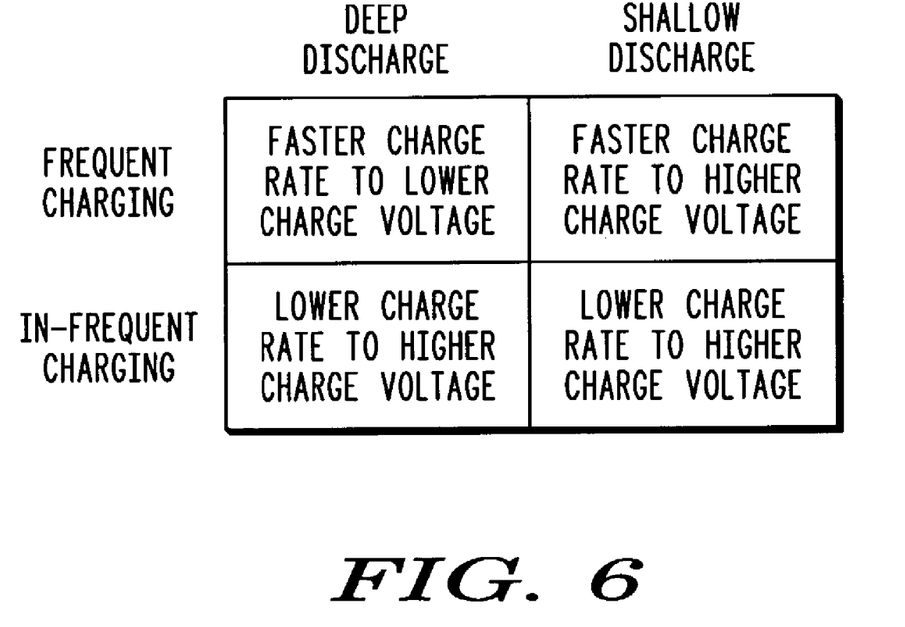
FIG. 6 is an exemplary use pattern diagram.

The "use" or discharge level in combination with the time between charges is used to categorize the user or "use" of the battery, as shown in FIG. 6, as a low capacity or a high capacity user. In this embodiment, the combination of the depth of discharge (deep discharge or shallow discharge) is combined with the time between charging cycles (frequent or infrequent) to determine the "use" characteristics. For example, "frequent" may be that the battery is charge every eight hours on average and "infrequent" may be that the battery is charged once every five days. In one embodiment, if a voltage level corresponding to 80% of the charge remaining was measured just prior to the initiation of recharging the battery, the end user is a 'low capacity' user and would likely benefit from a lower level of charge so a lower voltage for charging would be applied. At the same time, if the user charges the battery frequently, then the battery would be charged to a higher level of charge at fast charge rate 602. In the alternative, the user recharged the battery in-frequently, then the battery would be charged to the lower level of charge at a slower charge rate 604. In one embodiment, 4.10 volts is a lower charge level and would achieve a higher capacity over the life of the battery. As a consequence, this would result in a higher cycle life. Therefore the general category is a low capacity high life cycle pattern.

Alternately, if a voltage corresponding to 20% of the charge remaining was measured just prior to the insertion of the charger, then the user would be a 'high capacity' user and would likely benefit from a higher level of charge so a higher voltage for charging would be applied. Again if the user recharges frequently, a higher charge rate would be used to reach the higher charge voltage and for an in-frequent recharging, the rate would be slower. In this embodiment, recharging the battery to 4.20 volts would achieve a higher capacity over the life of the battery. This would result in a lower cycle life. Therefore the general category is a high capacity low life cycle pattern.

The discharge characteristics may also be determined as a result of the time between charges. If the battery was last charged 2 days ago, then the end user is a 'Low User' and would desire high capacity would likely benefit from a higher level of charge so a higher voltage for charging, such as 4.20 volts would achieve this result. This would also result in a lower cycle life. Alternately, if the battery was just charged 8 hours ago, then the end user is a 'high user' and would likely from a lower level of charge so a lower voltage, such as 4.10 volts would achieve this result. This would also result in a higher cycle life. Recharging said battery with a current between a first current and a second current, preferably with a third current between said first and said second current, in response to determining said battery charge level pattern being a low capacity fast charge time pattern, optimizes the battery performance for fast charge time and high cycle life.

The current at which the battery may be recharged may also be expressed in terms of a ratio. The ratio of the first current to the second current is optimally 3.0, however substantially the same results will occur wherein the ratio is between 1.5 and 4.5.

In the case of a high cycle life battery, the battery is not discharged completely or even substantially, also known as a shallow discharge, prior to being put on charge again. This battery use pattern occurs when the user frequently charges the battery or does not use the device often and the battery discharges at a slow rate.

In one embodiment, the time between charges is shown as being either Frequent or In-Frequent, such as 8 hours or 2 weeks respectively. The depth of discharge of the battery just prior to charge is determined to be either Deep or Shallow, such as 3.2 volts or 3.9 volts respectively. If the end user frequently charges and has a deeply discharged battery, he is both a heavy user and one who can benefit from a faster charge time and the battery will be charged to a higher voltage to prolong the life of his battery. This user will get a lower cycle life. If the end user has a shallow discharged battery but charges quite often, it is important to this person that the battery be charged fully at all times as shown by his meter. He really doesn't need a lot of charge though. So his battery is charged fast but to a lower voltage. This user will end up with a medium cycle life. If the end user charges infrequently, he gets the medium cycle life condition of a low charge rate coupled with a higher charge voltage resulting in higher capacity.

Figure 7:
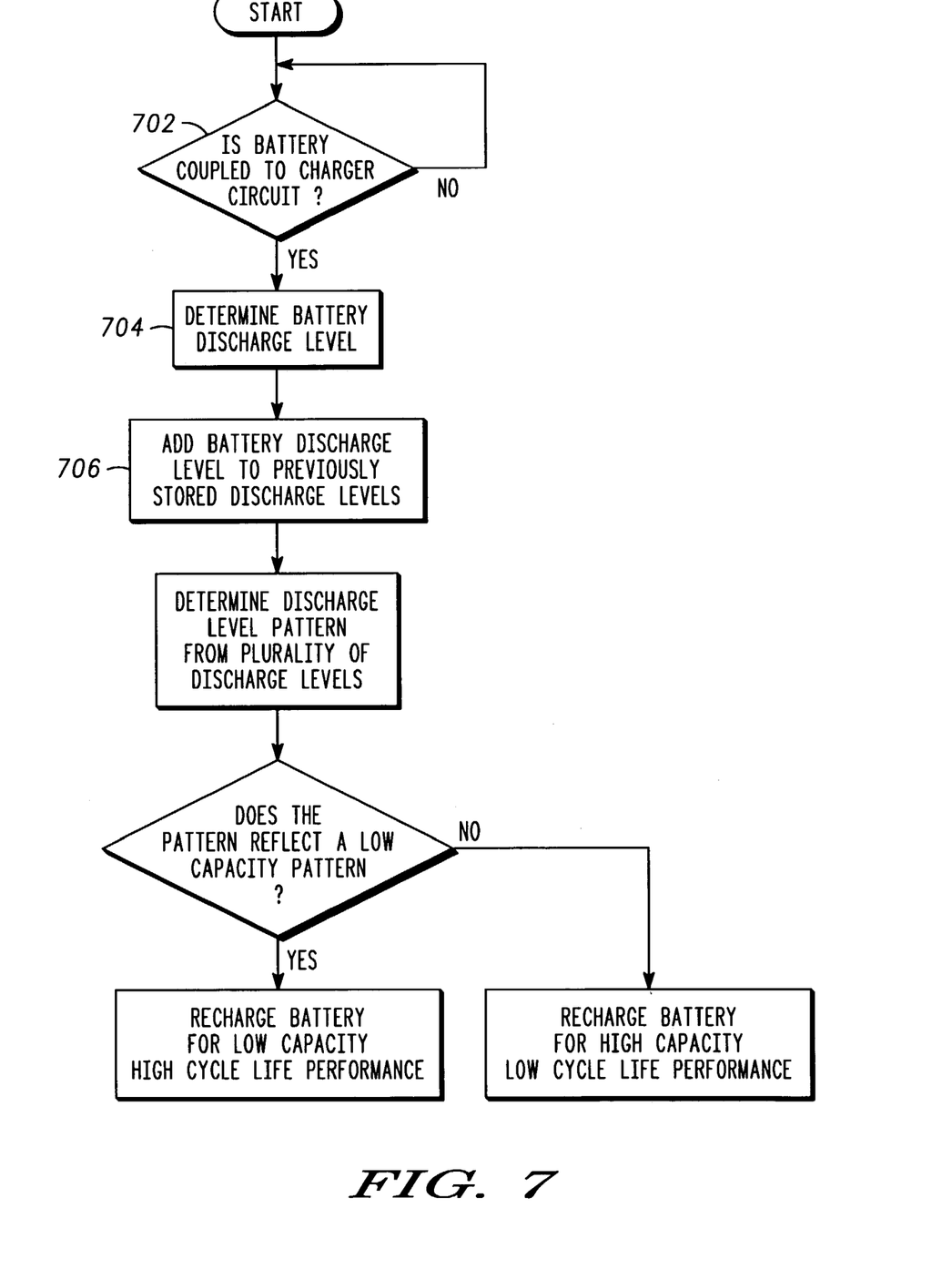
FIG. 7 is an exemplary flow diagram for selecting charging method based on a pattern.

As mentioned above, the battery discharge characteristic can be determined by one present measurement of the battery discharge level or from a plurality of previously stored discharge measurements that form a pattern when considered together. In FIG. 7, the present battery discharge measurement is combined with at least one stored previous measurement of the rechargeable battery discharge level 706. From the plurality of measurements a discharge level pattern is determined. The average of the plurality of measurements can be compared to the predetermined discharge value as the single measurement was compared as described above, and the plurality would eliminate abnormal behavior by the user. For example if the user is a low capacity high life cycle user, however allows his battery to discharge greater than normal in one or two instances, the average of the plurality of measurements will effectively eliminate the abnormal behavior. However, if the users behavior changes, the average will take the change into account because as more measurements are taken at the new behavior, the pattern will reflect the change. Old measurements are discarded in a first in first out basis determined by a predetermined measurement queue. The predetermined measurement queue will hold a certain number of measurements in memory and these constitute the plurality of measurements used to establish the discharge level pattern. In one embodiment, 10 discharge level measurements are kept in the queue or memory. The memory may be in the battery or in the electronic device powered by the battery. When a new discharge measurement is taken the oldest is discarded from the memory and not used in the average calculation, the new or present discharge level is included in the calculation.

Figure 8:
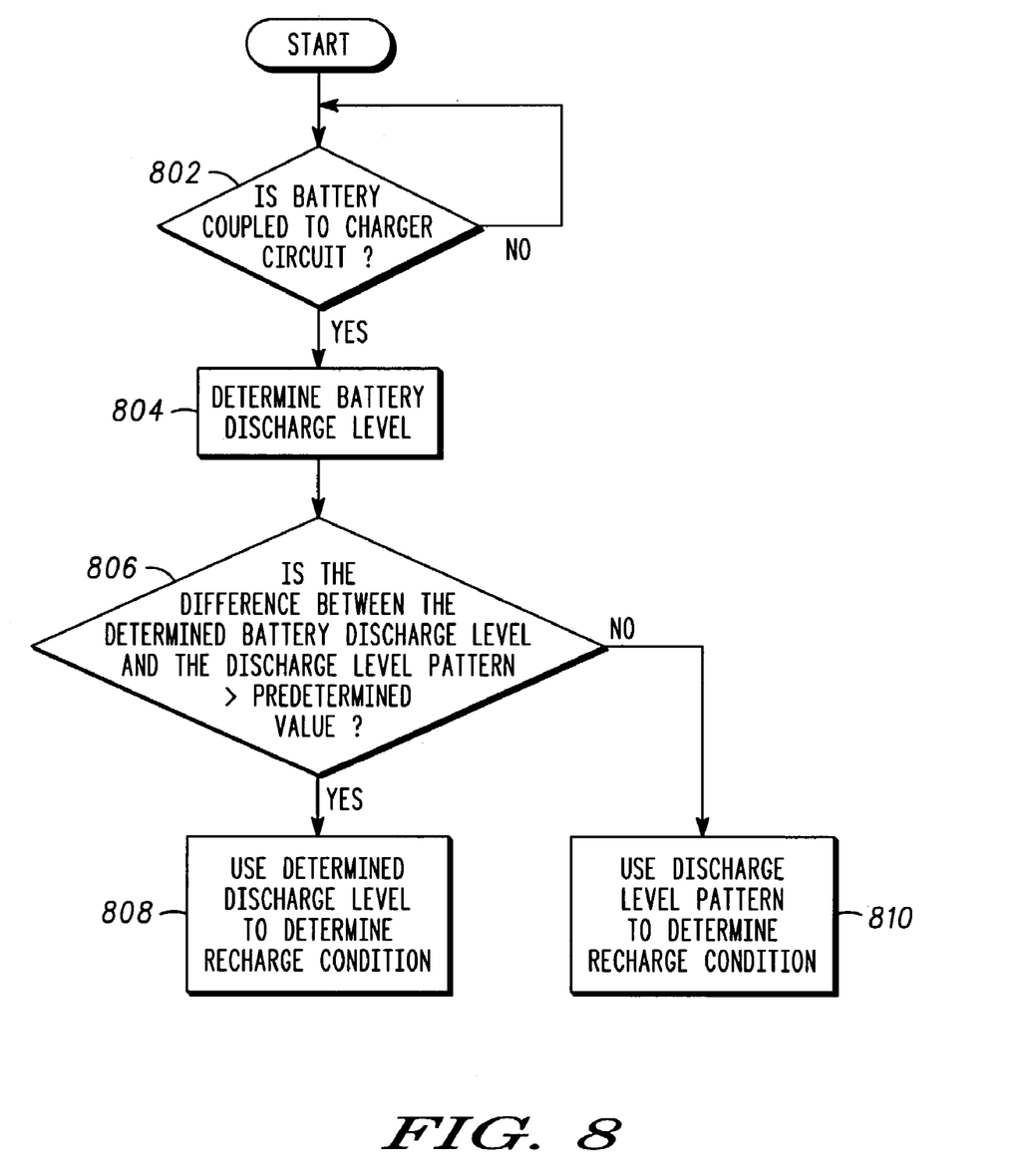
FIG. 8 is an exemplary flow diagram for selecting charging method based on a pattern.

In another embodiment, shown in FIG. 8, the difference between the discharge level and said determined discharge level pattern is determined. The difference is used to determine the recharging voltage. The method in this embodiment will then require recharging the rechargeable battery to a first voltage if said difference between said discharge level and said determined discharge level pattern is greater then a predetermined value 808, and then recharging said rechargeable battery to a second voltage if said difference between said discharge level and said determined discharge level pattern is less then a predetermined value 810.

In yet another embodiment, instead of charging to a certain voltage, the battery is recharged at the appropriate rate. This method requires recharging the rechargeable battery at a first rate if said difference between said discharge level and said determined discharge level pattern is greater then a predetermined value 808, and recharging said rechargeable battery at a second rate if said difference between said discharge level and said determined discharge level pattern is less then a predetermined value 810.

The voltages and current used for the above embodiments affect the performance of a lithium ion battery. There are many other types of batteries and it will be understood that the voltages and currents to achieve the desired effect of the invention will vary depending on the battery type.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method for recharging a rechargeable battery:
   determining a discharge voltage of a rechargeable battery when said rechargeable battery is coupled to a charging circuit;
   determining a recharge value that correlates at least to said determined discharge level; and
   recharging said rechargeable battery to a first determined recharge value in response to said determined discharge voltage being greater than a predetermined discharge voltage threshold and a time from a last charge cycle to said coupling said rechargeable battery to a charging circuit is greater than a predetermined time.

2. The method of claim 1, recharging said rechargeable battery to a first determined recharge value in response to said determined discharge voltage being less than a predetermined discharge voltage threshold.

3. The method of claim 1,
recharging said rechargeable battery to a first determined recharge value in response to said determined discharge voltage being less than a predetermined discharge voltage threshold and a time frame from said last charge cycle to said coupling said rechargeable battery to a charging circuit is greater than a predetermined time.

4. The method of claim 3, recharging said rechargeable battery at a first recharge rate in response to said determined discharge voltage being greater than a predetermined discharge voltage threshold, and at a second recharge rate in response to said determined discharge voltage being less than a predetermined discharge voltage threshold.

5. A method for recharging a rechargeable battery:
coupling a rechargeable battery to a charging circuit;
determining a discharge pattern of a rechargeable battery from a plurality of previously determined discharge measurements taken upon coupling said rechargeable battery to said charging circuit; and
selecting a recharge mode based on said discharge pattern; and
recharging said rechargeable battery with said recharge mode.

6. The method of claim 5, recharging said rechargeable battery to a first voltage in response to said determined discharge pattern being a low capacity high cycle life pattern,
recharging said rechargeable battery to a second voltage in response to said determined discharge pattern being a high capacity low cycle life pattern,
recharging said rechargeable battery at a first rate in response to said determined discharge pattern being a fast charge time low cycle life pattern, or
recharging said rechargeable battery at a second rate in response to said determined discharge pattern being a short charge time high cycle life pattern.

7. The method of claim 6,
coupling said rechargeable battery to a charging circuit;
determining a discharge level of said rechargeable battery;
determining the difference between said discharge level and said determined discharge level pattern; and
recharging said rechargeable battery to a first voltage if said difference between said discharge level and said determined discharge level pattern is greater then a predetermined value, and
recharging said rechargeable battery to a second voltage if said difference between said discharge level and said determined discharge level pattern is less then a predetermined value.

8. The method of claim 7,
recharging said rechargeable battery at a first rate if said difference between said discharge level and said determined discharge level pattern is greater then a predetermined value, and
recharging said rechargeable battery at a second rate if said difference between said discharge level and said determined discharge level pattern is less then a predetermined value.

9. A method for recharging a rechargeable battery:
determining a discharge voltage of a rechargeable battery when said rechargeable battery is coupled to a charging circuit; and
determining a recharge value that correlates at least to said determined discharge level;
recharging said rechargeable battery to a first determined recharge value in response to said determined discharge voltage level being greater than a predetermined discharge voltage threshold and a time from a last charge cycle to said coupling said rechargeable battery to a charging circuit is greater than a predetermined time; and
recharging said rechargeable battery to a first determined recharge value in response to said determined discharge voltage being less than a predetermined discharge voltage threshold and a time frame from said last charge cycle to said coupling said rechargeable battery to a charging circuit is greater than a predetermined time.

10. A method for recharging a rechargeable battery:
determining a discharge voltage of a rechargeable battery when said rechargeable battery is coupled to a charging circuit;
determining a recharge value that correlates at least to said determined discharge level; and
recharging said rechargeable battery at a first recharge rate in response to said determined discharge voltage level being greater than a predetermined discharge voltage threshold, and at a second recharge rate in response to said determined discharge voltage being less than a predetermined discharge voltage threshold.

11. A method for recharging a rechargeable battery:
determining a discharge voltage of a rechargeable battery when said rechargeable battery is coupled to a charging circuit;
determining a recharge value that correlates at least to said determined discharge level;
recharging said rechargeable battery at a first rate if said difference between said discharge level and said determined discharge level pattern is greater then a predetermined value, and
recharging said rechargeable battery at a second rate if said difference between said discharge level and said determined discharge level pattern is less then a predetermined value.

12. A method for recharging a rechargeable battery:
determining a discharge level pattern of a rechargeable battery when said rechargeable battery is coupled to a charging circuit; and
determining a battery recharge method based on the determined discharge level pattern.

13. The method of claim 12,
recharging said rechargeable battery with a first battery recharge method if said determined discharge level pattern of said rechargeable battery is greater than a predetermined value, and
recharging said rechargeable battery with a second battery recharge method if said determined discharge level pattern of said rechargeable battery is less than said predetermined value.

14. The method of claim 12,
measuring a discharge level of a rechargeable battery when said rechargeable battery is coupled to a charging circuit; and
storing each rechargeable battery discharge level as a part of the discharge level pattern.

15. The method of claim 14, determining the rechargeable battery discharge level pattern from a plurality of said rechargeable battery discharge measurements.

16. The method of claim 15, determining that said rechargeable battery discharge level pattern is a low capacity high cycle life pattern, a high capacity low cycle life pattern, fast charge time low cycle life pattern, or a short charge time high cycle life pattern.

17. The method of claim 16, recharging said rechargeable battery to a voltage level between a first voltage and a second voltage; and preferably to a third voltage between said first voltage and said second voltage, in response to determining said battery discharge level pattern being a low capacity high cycle life pattern.

18. The method of claim 16, recharging said rechargeable battery to a voltage between 4.05 volts and 4.15 volts, preferably 4.1 volts in response to determining that said rechargeable battery discharge level pattern corresponds to a low capacity high cycle life pattern.

19. The method of claim 16, recharging said battery by applying a first current in response to determining said battery discharge level pattern to be a high capacity low cycle life pattern; and recharging said battery by applying a second current in response to determining said battery discharge level pattern to be a low capacity high cycle life pattern.

20. The method of claim 19, wherein the ratio of said first current to said second current is between 1.5 and 4.5 and preferably 3.0.

21. The method of claim 16, recharging said battery by applying a first current, said first current between 0.2 amps and 0.5 amps in response to determining said battery discharge level pattern to be a high capacity low cycle life pattern, and charging said battery by applying a second current between 0.5 amps and 2.0 amps in response to determining said battery discharge level pattern being to be a low capacity high cycle life pattern.

22. The method of claim 16, recharging said battery to a voltage between a fourth voltage and a fifth voltage, preferably a sixth voltage, in response to determining said battery discharge level pattern to be high capacity low cycle life high capacity pattern.

23. The method of claim 22, recharging said battery to a voltage between 4.15 volts and 4.2 volts, preferably 4.2 volts, in response to determining said battery discharge level pattern to be high capacity low cycle life pattern.

24. The method of claim 12, further comprising: recharging said battery with a current between a first current and a second current, preferably a third current between said first and said second current, in response to determining said battery discharge level pattern being a fast charge time low capacity pattern.

25. The method of claim 24, recharging said battery with a first current to between 0.5 amps and 2.0 amps; and preferably 1.0 amp in response to determining that said battery discharge level pattern is a fast charge time low cycle life pattern.

26. The method of claim 24, charging said battery with a first current to between 0.2 amps and 0.5 amps; and preferably 0.35 amps in response to determining that said battery discharge level pattern is a slow charge time high cycle life slow charge time pattern.

27. The method of claim 16, determining a rechargeable battery discharge level pattern to be a low capacity high cycle life pattern when said battery is coupled to said charging circuit when said battery has a capacity greater than a 50 percent and when the time between charge cycles is twenty four hours or less, determining a rechargeable battery discharge level pattern to be a high capacity low cycle life pattern when said battery is coupled to said charging circuit when said battery has a capacity less than a 50 percent and when the a time between charge cycles is twenty four hours or greater;

determining a rechargeable battery discharge level pattern to be a fast charge time low cycle life pattern when a battery charge time is less than one half a full charge time for said battery, determining a rechargeable battery discharge level pattern to be a slow charge time high cycle life pattern when a battery charge time is greater than one half a full charge time for said battery, determining a rechargeable battery discharge level pattern to be, a slow charge high cycle life pattern, by determining that the time from when the battery has reached a full charge to the time the battery is disconnected from the charger is greater than 60 minutes, and a fast charge low cycle life pattern, by determining that the time from when the battery has reached a full charge to the time the battery is disconnected from the charger is less than 60 minutes.

28. The method of claim 12, storing said battery charge level value in a memory of said portable device.

29. The method of claim 12, storing said battery charge level value in a memory of a battery.

30. The method of claim 12, storing said one of a plurality of battery charge level values in a memory in response to coupling a battery to a charging device.

* * * * *